(12) United States Patent
Shi et al.

(10) Patent No.: US 10,885,648 B2
(45) Date of Patent: Jan. 5, 2021

(54) METHOD OF RECONSTRUCTING THREE DIMENSIONAL IMAGE USING STRUCTURED LIGHT PATTERN SYSTEM

(71) Applicant: Samsung Electronics Co., Ltd., Suwon-si (KR)

(72) Inventors: Lilong Shi, Pasadena, CA (US); Yibing Michelle Wang, Pasadena, CA (US)

(73) Assignee: SAMSUNG ELECTRONICS CO., LTD.

( * ) Notice: Subject to any disclaimer, the term of this patent is extended or adjusted under 35 U.S.C. 154(b) by 239 days.

(21) Appl. No.: 16/186,463

(22) Filed: Nov. 9, 2018

(65) Prior Publication Data

US 2020/0027228 A1   Jan. 23, 2020

Related U.S. Application Data

(60) Provisional application No. 62/701,500, filed on Jul. 20, 2018.

(51) Int. Cl.
| | | |
|---|---|---|
| *G06T 7/521* | (2017.01) | |
| *H04N 13/254* | (2018.01) | |
| *H04N 13/271* | (2018.01) | |
| *H04N 13/00* | (2018.01) | |

(52) U.S. Cl.
CPC .......... *G06T 7/521* (2017.01); *H04N 13/254* (2018.05); *H04N 13/271* (2018.05); *G06T 2207/10028* (2013.01); *H04N 2013/0081* (2013.01)

(58) Field of Classification Search
CPC .......... G06T 7/521; G06T 2207/10028; G06T 2207/20021; H04N 13/254; H04N 13/271; H04N 2013/0081; G01B 11/2513
See application file for complete search history.

(56) References Cited

U.S. PATENT DOCUMENTS

| | | | |
|---|---|---|---|
| 9,915,827 | B2 | 3/2018 | Gordon |
| 10,008,027 | B1 | 6/2018 | Baker |
| 2014/0219549 | A1 | 8/2014 | Choi et al. |
| 2015/0145959 | A1* | 5/2015 | Tang ............... H04N 13/254 348/46 |
| 2016/0245641 | A1 | 8/2016 | Kowdle et al. |
| 2019/0102044 | A1* | 4/2019 | Wang ............... G06F 3/0416 |
| 2019/0339369 | A1* | 11/2019 | Fenton ............... G06T 7/85 |

OTHER PUBLICATIONS

Fenallo, Sean Ryan et al., "HyperDepth: Learning Depth from Structured Light Without Matching", 2016 IEEE Conference on Computer Vision and Pattern Recognition (CVPR), Jun. 27-30, 2016, Las Vegas, NV, USA, pp. 5441-5450.

* cited by examiner

*Primary Examiner* — Phuoc Tran (74) *Attorney, Agent, or Firm* — Renaissance IP Law Group LLP

(57) ABSTRACT

A method of reconstructing a three dimensional image using a structured light pattern system is provided as follows. A class identifier of an observed pixel on a captured image by a camera is extracted. The observed pixel has a coordinate (x, y) on the captured image. A first relative position of the x coordinate of the observed pixel in a tile domain of the captured image is calculated. A second relative position of one of a plurality of dots in a tile domain of a reference image using the extracted class identifier is calculated. A disparity of the observed pixel using the first relative position and the second relative position is calculated.

20 Claims, 8 Drawing Sheets

- S210: Generating a reference image having a plurality of dots as a structured-light pattern
- S220: Illuminating a projected image onto an object
- S230: Capturing a projected image deformed due to the object as a captured image
- S240: Moving an window along a scanline to extract a class identifier z_id of an observed pixel $p_c(x,y)$ on the captured image
- S250: Translating an observed position x of the observed pixel $p_c(x,y)$ into a tile domain of the captured image to generate a first relative position x' in the tile domain of the captured image
- S260: Calculating a second relative position x_ref in a tile domain of the reference image using y of the observed pixel $p_c(x,y)$ and the extracted class identifier z_id
- S270: Reconstructing a depth map based on a disparity d = x' − x_ref

Tile domain of reference image

METHOD OF RECONSTRUCTING THREE DIMENSIONAL IMAGE USING STRUCTURED LIGHT PATTERN SYSTEM

CROSS-REFERENCE TO RELATED APPLICATION

This application claims the priority of U.S. Provisional Application No. 62/701,500 filed on Jul. 20, 2018, the disclosure of which is incorporated herein by reference in its entirety.

TECHNICAL FIELD

The present inventive concept relates to a method of reconstructing a three dimensional image using a structured light pattern system.

DISCUSSION OF RELATED ART

Structured light systems are used to reconstruct a three dimensional image of an object. To calculate a disparity map, the structured light systems perform various stereo matching algorithms that correlate patches of pixels in the captured image of the camera and the reference image of the projector, which demand massive computation for comparing and selecting a best-matched patch with excessive power consumption. The stereo matching algorithms may continue to access a memory storing the reference image while they are in operation.

SUMMARY

According to an exemplary embodiment of the present inventive concept, a method of reconstructing a three dimensional image using a structured light pattern system is provided as follows. A class identifier of an observed pixel on a captured image by a camera is extracted. The observed pixel has a coordinate (x, y) on the captured image. A first relative position of the x coordinate of the observed pixel in a tile domain of the captured image is calculated. A second relative position of one of a plurality of dots in a tile domain of a reference image using the extracted class identifier is calculated. A disparity of the observed pixel using the first relative position and the second relative position is calculated.

According to an exemplary embodiment of the present inventive concept, a method of reconstructing a three dimensional image using a structured light pattern system is provided as follows. A projected image to be projected onto an object is generated from a reference image. The reference image includes a plurality of tiles. Each of the tiles includes a plurality of dots each of which is assigned to one of a plurality of class identifiers. A captured image is generated from the projected image onto the object. A class identifier of an observed pixel on the captured image is generated. A first relative position of the observed pixel in a tile domain of the captured image is calculated. A second relative position of one of the plurality of dots in a tile domain of the reference image is calculated using the extracted class identifier and a y coordinate of the observed pixel. A disparity of the observed pixel is calculated using the first relative position and the second relative position.

A method of reconstructing a three dimensional image using a structured light pattern system is provided as follows. A reference image including a plurality of tiles is generated. Each of the tiles includes a plurality of dots each of which is assigned to one of a plurality of class identifiers. A projected image generated from the reference image is projected onto an object having a three-dimensional surface. The projected image onto the object is captured to generate a captured image. A class identifier from an observed pixel on the captured image is extracted. The observed pixel is translated into a tile domain of the captured image to generate a first relative position in the tile domain of the captured image. A second relative position of one of the plurality of dots in a tile domain of the reference image is calculated using the extracted class identifier. A disparity of the observed pixel is calculated using the first relative position and the second relative position. A three-dimensional profile of the object is generated using the disparity.

BRIEF DESCRIPTION OF DRAWINGS

These and other features of the present inventive concept will become more apparent by describing in detail exemplary embodiments thereof with reference to the accompanying drawings of which.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION OF EXEMPLARY EMBODIMENTS

Exemplary embodiments of the present inventive concept will be described below in detail with reference to the accompanying drawings. However, the inventive concept may be embodied in different forms and should not be construed as limited to the embodiments set forth herein.

Figure 1:
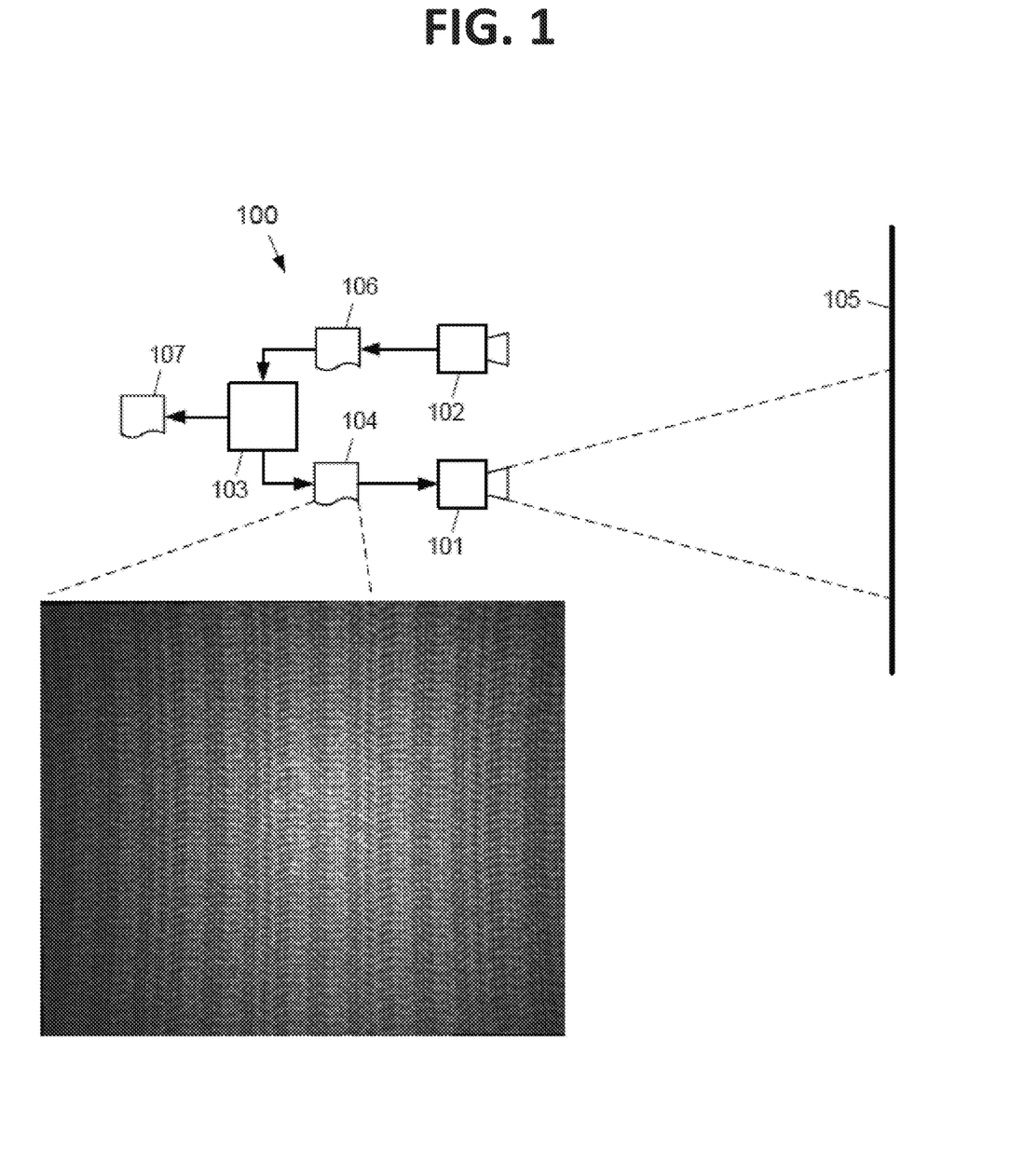
FIG. 1 shows a block diagram of a structured light pattern system according to an exemplary embodiment of the present inventive concept.

FIG. 1 shows a block diagram of a structured light pattern system 100. The structured light pattern system 100 includes a projector 101, a camera 102 and a processor 103. The structured light pattern system 100 may be a stand-alone system. The present inventive concept is not limited thereto.

For example, the structured light pattern system 100 may be part of a handheld device, such as, but not limited to, a smartphone, a cellphone or a digital camera.

The processor 103 sends a reference image 104 having a structured-light pattern to the projector 101 projecting the reference image 104 onto an object 105. The object 105 is represented by a line for simplicity of description. The object 105 may include, but not limited to, a human face or a scene, for example.

The processor 103 may be a microprocessor or a programmed software codes, a dedicated integrated circuit or a combination of both. For example, the processor 103 may operate according to codes implemented completely via software, via software accelerated by a graphics processing unit (GPU) or a multicore system. The processor 103 may include a dedicated hardware implemented for the processing operations. Both hardware and software configurations may provide different stages of parallelism.

The projector 101 and the camera 102 may be matched in the visible region or in the infrared light spectrum, which may not be visible to human eyes. For the convenience of description, it is assumed hereinafter that the projector 101 and the camera 102 are matched in the infrared light spectrum.

The projector 101 may generate an infrared light having a projected image from the reference image 104 and illuminate the projected image onto the object 105. The projector 101 may include a light source, such as a laser diode or light-emitting-diode (LED). The projected image may have a structured-light pattern rotated from that of the reference image 104 at a predetermined rotation angle. The rotation will be described in more detail with reference to FIG. 6.

The camera 102 captures the projected image onto the object 105 and generates a captured image 106. The camera 102 may be an infrared camera having an infrared image sensor. The captured image 106 is transmitted to the processor 103, and the processor 103 generates a depth map 107 of the object 105.

According to an exemplary embodiment, the processor 103 may calculate a disparity without correlating the reference image 104 and the captured image 106, thereby reducing the amount of computation and power consumption, and thereby avoiding access to a memory storing the reference image 104.

Hereinafter, it will be described with reference to FIGS. 2 to 7 that how the structured light pattern system 100 operates to generate the depth map 107 of the object 105.

Figure 2:
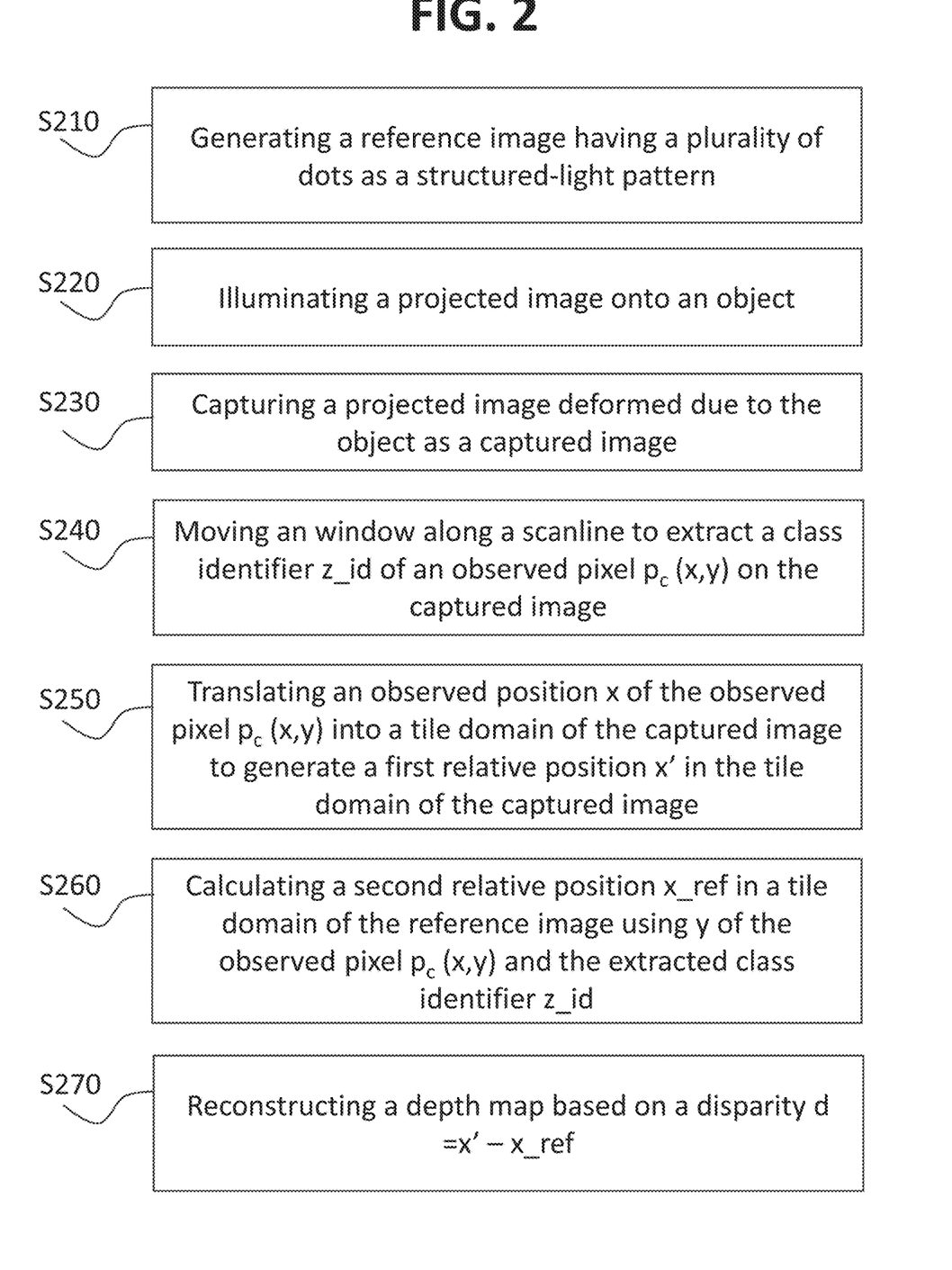
FIG. 2 shows a process flow for generating a depth map using a structured light pattern system according to an exemplary embodiment of the present inventive concept.
Figure 3:
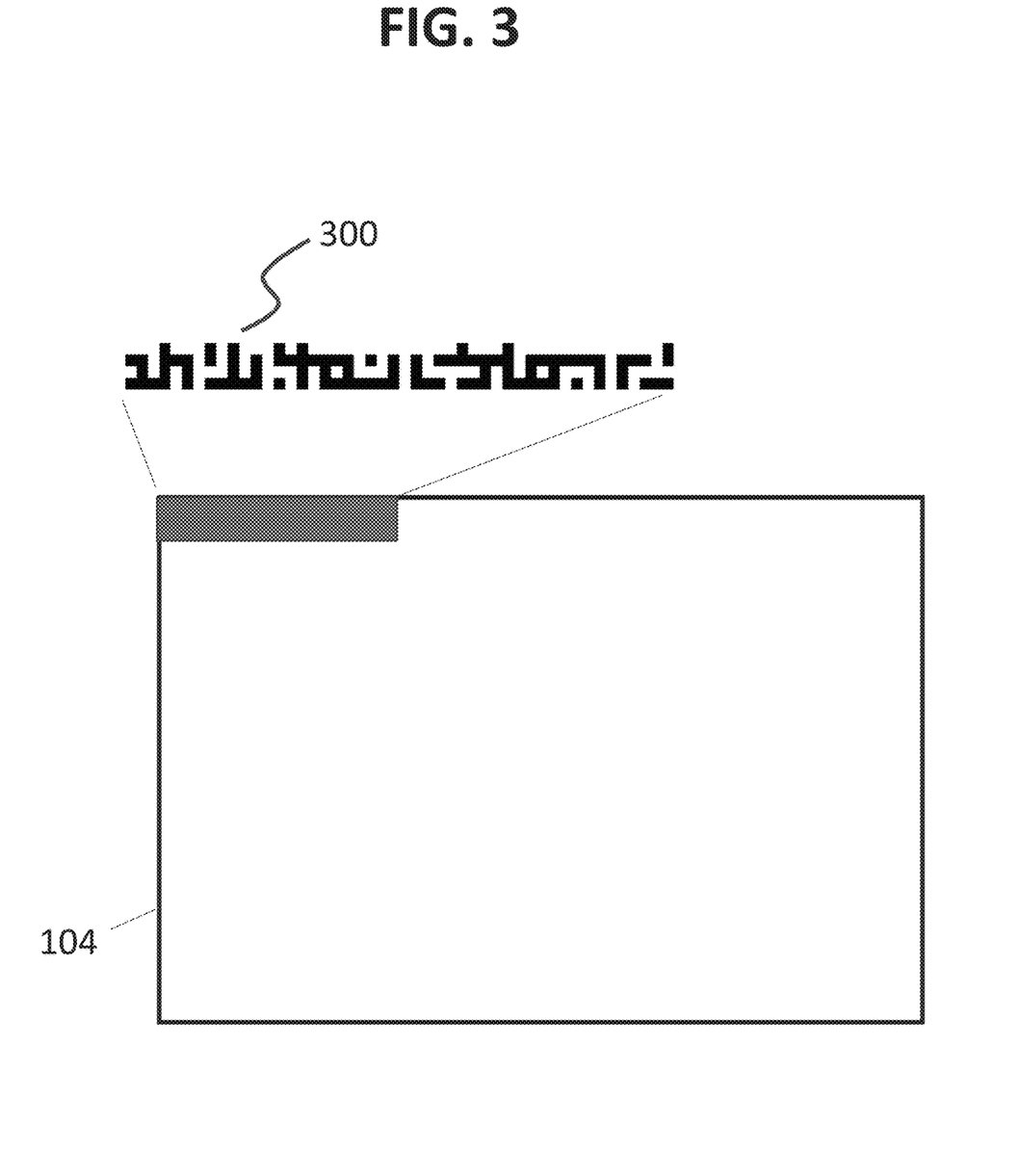
FIG. 3 shows a reference image having structured-light patterns according to an exemplary embodiment of the present inventive concept.
Figure 4A:
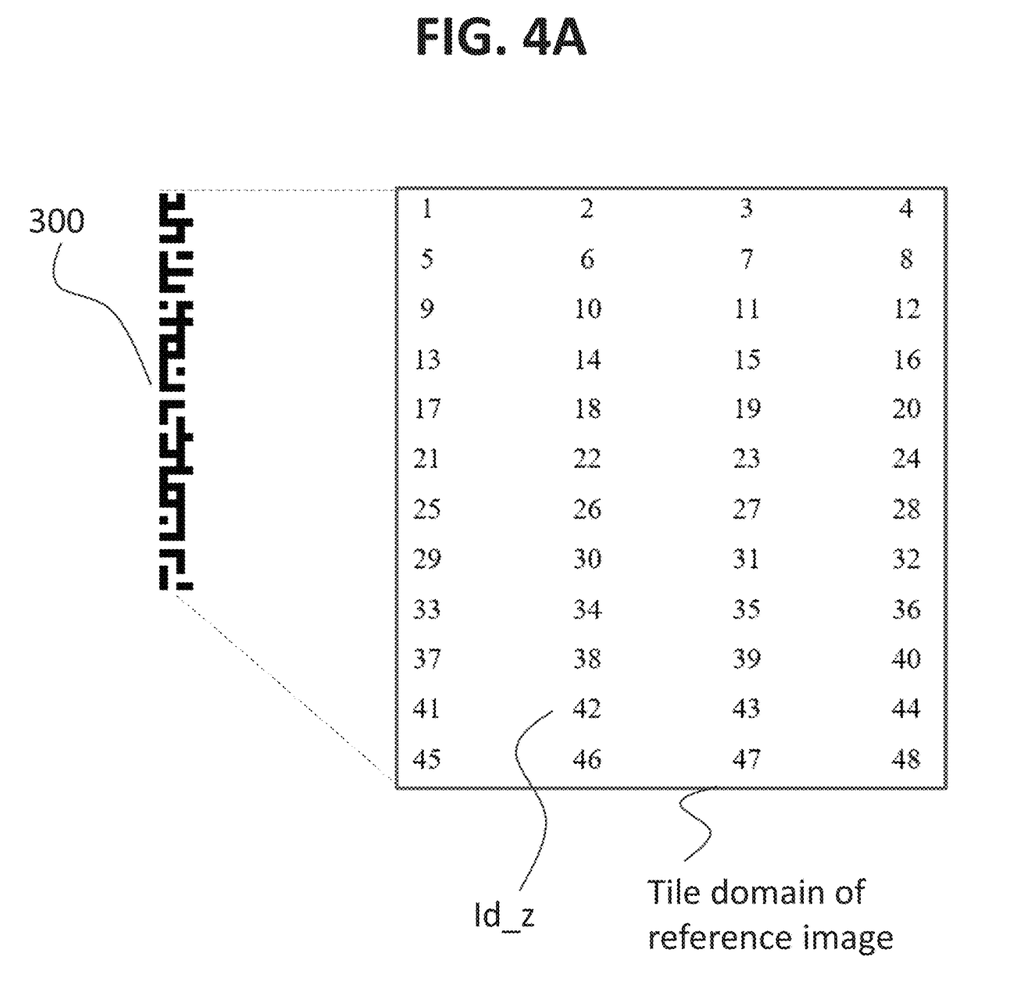
FIG. 4A shows a plurality of class identifiers assigned to structured-light patterns of a reference image according to an exemplary embodiment of the present inventive concept.
Figure 4B:
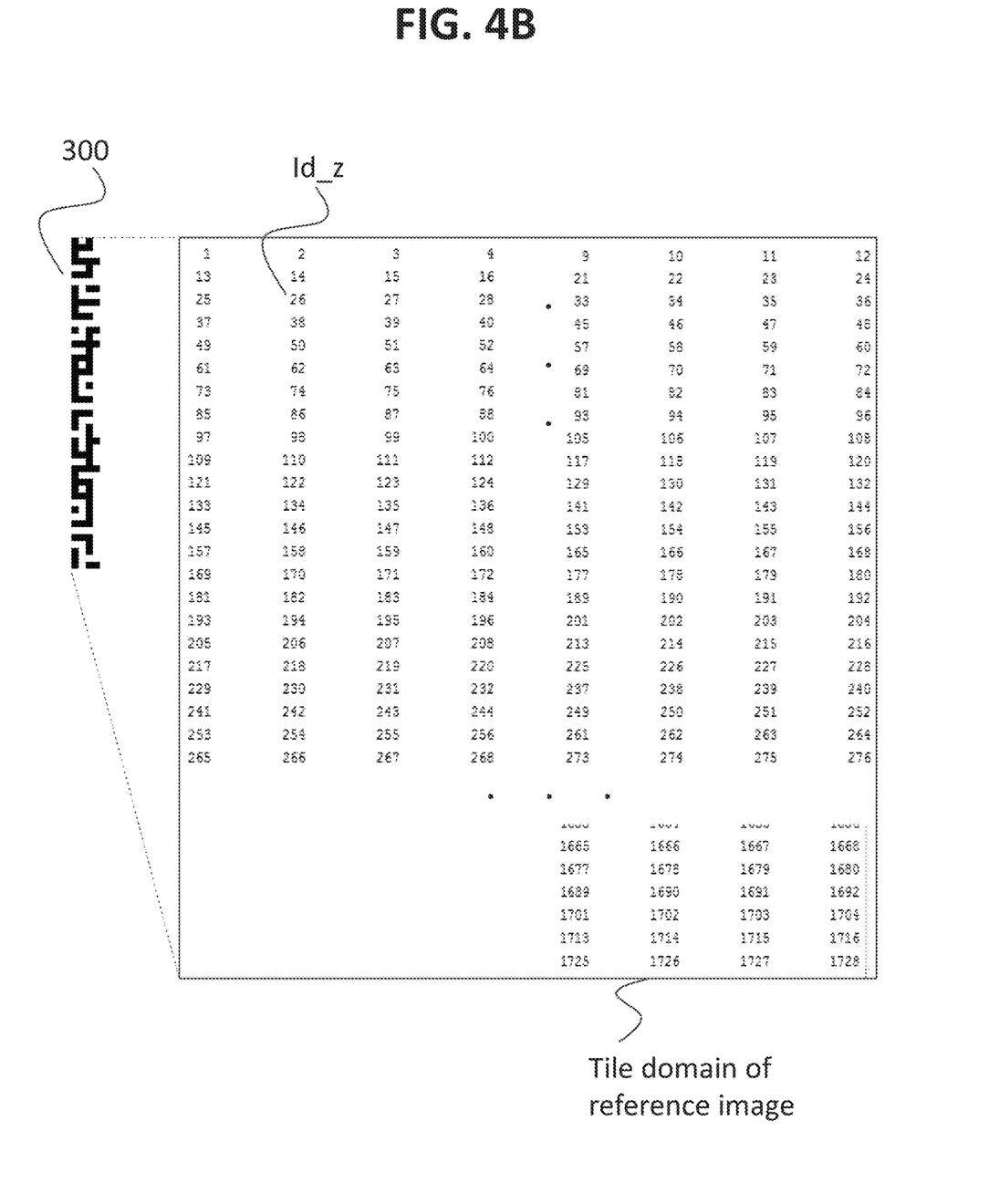
FIG. 4B shows a plurality of class identifiers assigned in a sub-dot scale to structured-light patterns of a reference image according to an exemplary embodiment of the present inventive concept.
Figure 5:
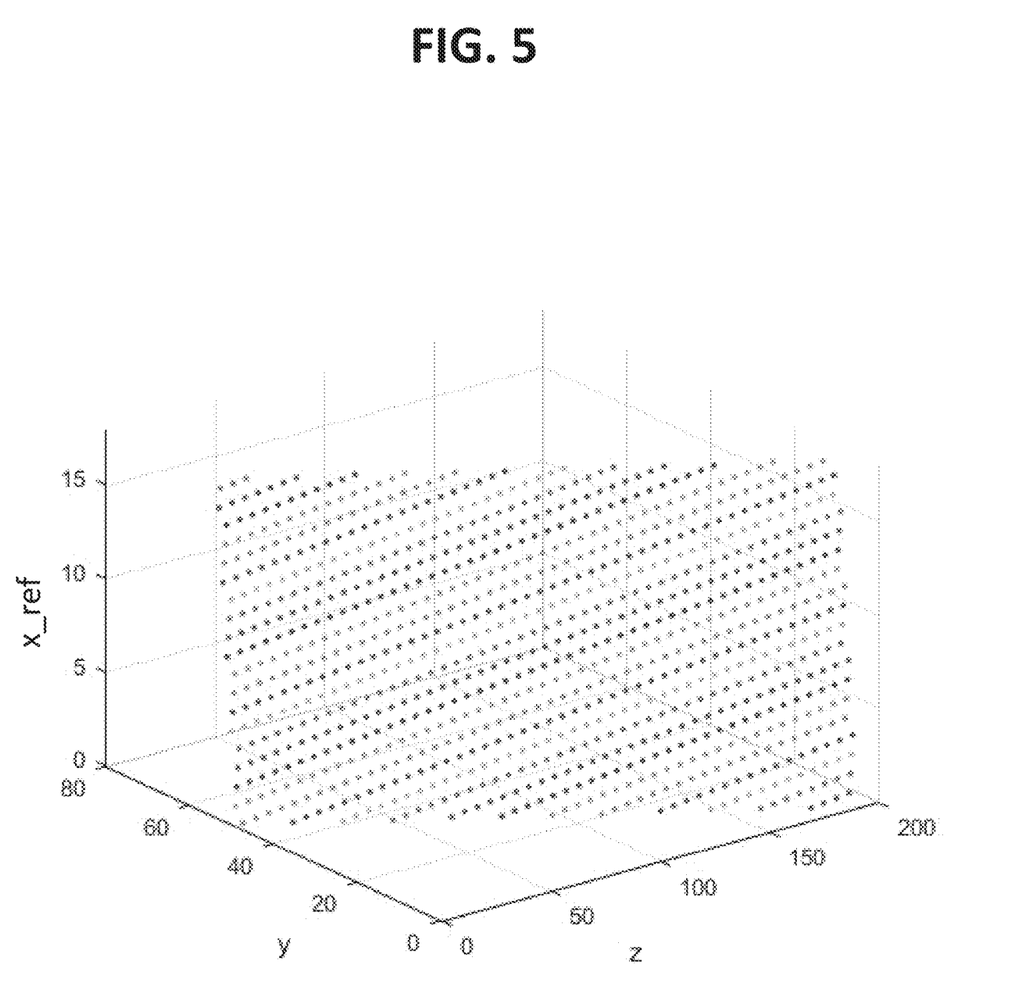
FIG. 5 shows a distribution of a plurality of class identifiers on a tile domain of a reference image according to an exemplary embodiment of the present inventive concept.
Figure 6:
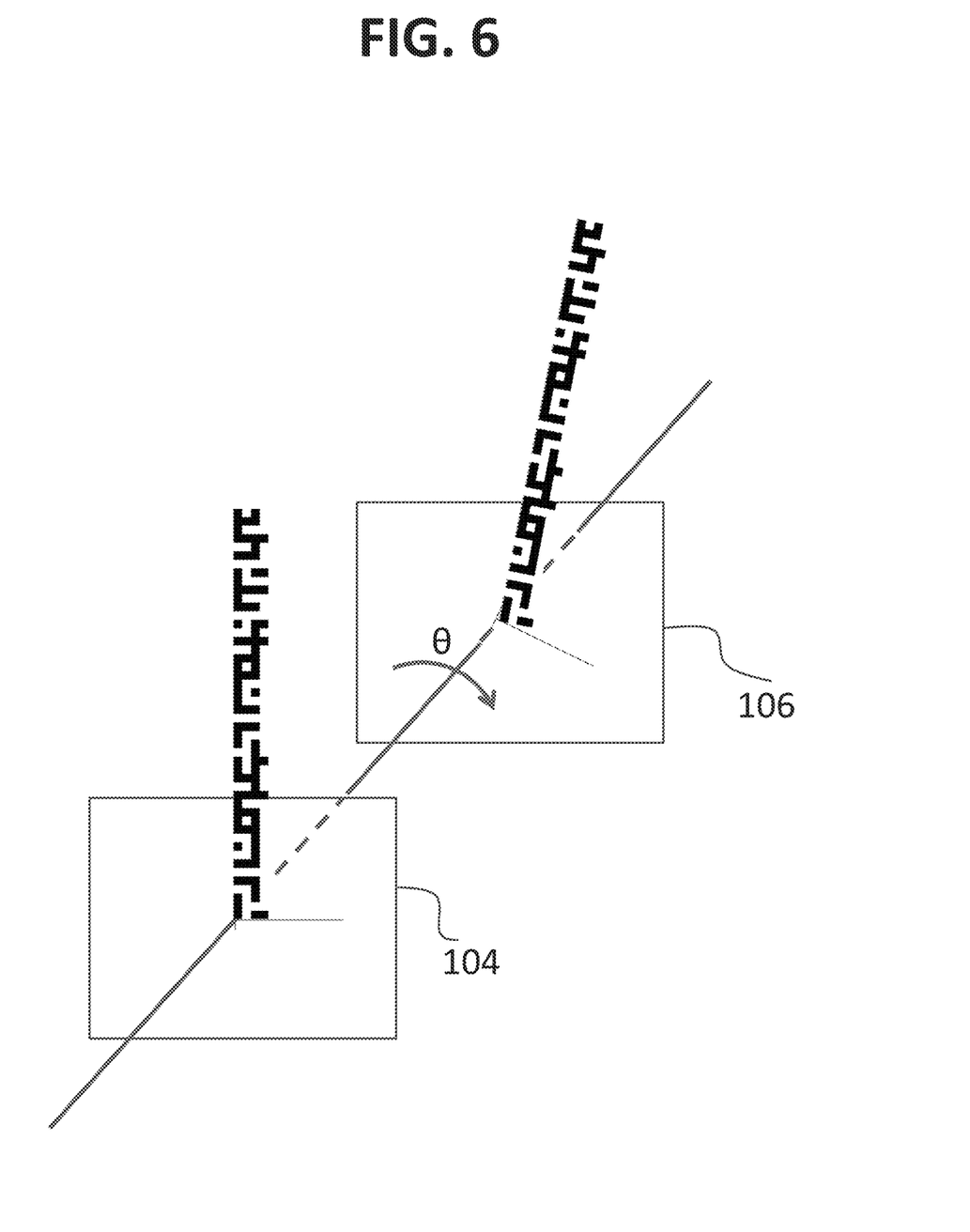
FIG. 6 shows rotation of structured patterns in a reference image at a predetermined rotation angle θ according to an exemplary embodiment of the present inventive concept.
Figure 7:
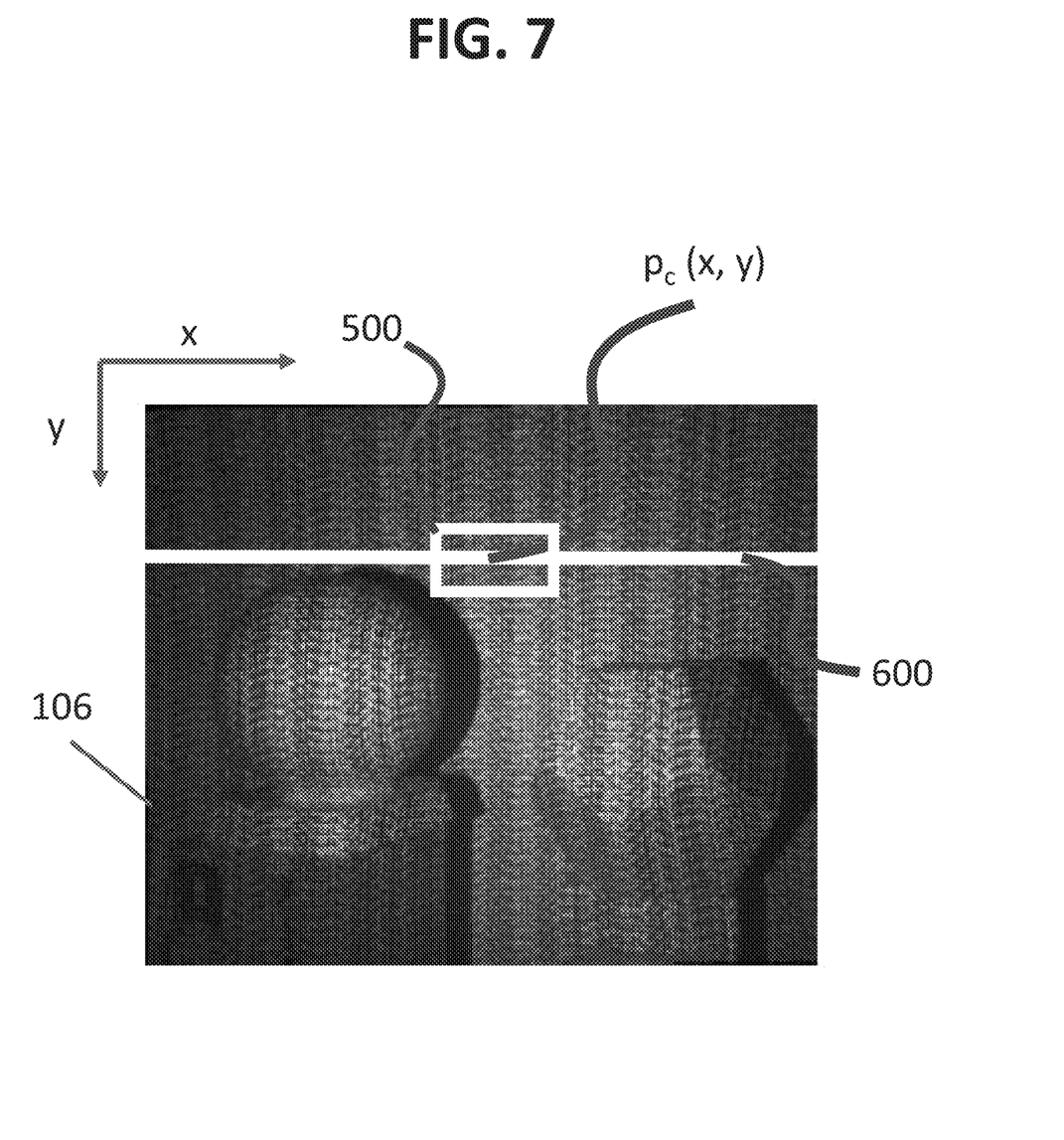
FIG. 7 shows a captured image of an object according to an exemplary embodiment of the present inventive concept.

FIG. 2 shows a process flow for generating the depth map 107 using the structured light pattern system 100. FIG. 3 shows the reference image 104 having structured-light patterns. FIG. 4A shows a plurality of class identifiers assigned to structured-light patterns of the reference image 104. FIG. 4B shows a plurality of class identifiers assigned in a sub-dot scale to structured-light patterns of the reference image 104. FIG. 5 shows a distribution of a plurality of class identifier on a tile domain of the reference image 104. FIG. 6 shows rotation of structured-light patterns in the reference image 104 at a predetermined rotation angle θ. FIG. 7 shows the captured image 106 of the object 105. The "tile domain" of the reference image 104 represents relative coordinates on which the plurality of dots of each tile are distributed with a unique relative location.

In the structured light pattern system 100, no matching operations or access to the reference image 104 is performed at runtime. In contrast, a structured light pattern system that is used in the industry may perform a matching operation to identify, using various stereo matching algorithms, a conjugate pixel of the reference image 104 corresponding to an observed pixel of the captured image 106. The matching algorithms may demand massive computation for comparison. The matching algorithms may also cause a high input/output (I/O) access to a memory storing the reference image 104. For example, the Kinetic performs the PrimeSense algorithm that extracts observed dots, then matches a patch around each dot, with corresponding patches in the reference image using the normalized cross correlation (NCC) algorithm. The NCC algorithm performs about twenty (20) NCC patch matches per pixel, with the minimum NCC score being selected. Then a sequential region growing process is performed to create a dense disparity map. Each of dot extraction, NCC patch matching, disparity selection and region growing takes considerable time with many pixel lookup and operations.

According to an exemplary embodiment, a disparity (d) is calculated as follows:

$$d = x' - x\_\text{ref} \quad \text{[Equation 1]}$$

In Equation 1, x' represents a first relative position of an observed pixel $p_c$ (x, y) within a tile domain of the captured image 106, an observed position x of the observed pixel $p_c$ (x, y) being translated into the first relative position x' (hereinafter, x' will also be referred to as a translated position x'), x is a value of x coordinate in a row (or a horizontal direction) of the captured image 106 and y is a value of y coordinate in a column (or a vertical direction) of the captured image 106.

In Equation 1, x_ref represents a second relative position of a dot corresponding to the observed pixel $p_c$ (x, y) within a tile domain of the reference image 104, the second relative position x_ref of the dot being calculated using a function derived from a distribution of a plurality of class identifiers assigned to a plurality of dots of the reference image 104 (hereinafter, x_ref will be referred to as a conjugate reference position x_ref).

The distribution of the class identifiers are fitted into Equation 2, and the function may be expressed as Equation 3 or Equation 4. The functions expressed in Equations 2, 3 and 4 each may represent a distribution of the plurality of class identifiers on the tile domain of the reference image 104. The Equations 2, 3 and 4 will be described below.

With reference to FIGS. 2 to 7, the inventive concept described above will be further described. Starting with step S210 in FIG. 2, the processor 103 generates the reference image 104 to be illuminated onto the object 105. The reference image 104, as shown in FIG. 3, includes a tile 300 that is repeated or tiled in both horizontal direction and vertical direction to completely fill the reference image 104. The tile 300 is repeated ten times in the horizontal direction and 160 times in the vertical direction for the projector 101 having a VGA resolution, for example.

The tile 300 may include a plurality of dots. For example, the tile 300 includes 48 dots arranged in the horizontal direction, and four dots arranged in the vertical direction. In this case, the tile 300 includes 196 (48×4) dots. Each dot (black or white) has surrounding black or white dots uniquely arranged such that each dot and its surrounding black or white dots may constitute a unique pattern in the tile 300. For a pattern having 4×4 dots, there are a total of 192 unique patterns in the tile 300.

FIG. 4A shows a plurality of class identifiers id_z assigned to structured light patterns of the reference image 104. In an exemplary embodiment, the structured light patterns may include the plurality of dots uniquely arranged as shown in tile 300 of FIG. 3. However, the present inventive concept is not limited thereto. For example, the structured light patterns may include various patterns. For example, the structured light patterns may include a binary encoded pattern or a star-like pattern.

In FIG. 4A, each of the class identifiers id_z is assigned to one of the plurality of dots in the tile 300 of the reference image 104. Since the tile 300 has 192 unique patterns, each pattern (or each dot) may be classified with a unique class identifier among the class identifiers id_z having values from 1 to 192. The class identifiers id_z are assigned to the dots left-to-right in a row, then continue to be assigned left-to-right in the next row until the class identifiers id_z all are assigned to the dots in the tile 300. The class identifiers id_z may be integers, and the integer values of the class identifiers id_z successively increase.

FIG. 4B shows a plurality of class identifiers assigned in a sub-dot scale to structured-light patterns of the reference image 104. To avoid quantization of disparity maps, each of the class identifiers id_z need to support sub-dot shifts of the structured-light patterns on the captured image 106. For sub-dot accuracy, each dot is additionally divided into a plurality of sub-dots, equal to the desired level of sub-dot precision. For example, each dot may be divided into 3×3 sub-dots such that the tile 300 includes 1728 (4×48×16) unique sub-dots. A plurality of class identifiers having a value from 1 to 1728 are assigned to each of the unique sub-dots in the same manner as described with reference to FIG. 4A. For the convenience of description, FIG. 4B shows partially the plurality of class identifiers.

In FIGS. 4A and 4B, each dot having its corresponding class identifier id_z is represented by a point uniquely defined in the tile domain of the reference image 104. In other words, the class identifiers id_z are distributed over the tile domain of the reference image 104. For example, the distribution of the class identifiers id_z in FIG. 4B may be visualized as shown in FIG. 5.

In FIG. 5, the class identifiers id_z are represented by values in the z-axis. The distribution of the class identifiers id_z may be fitted to a fitting function ID (y, x_ref) such that the fitting function ID (y, x_ref) may represent the distribution of the class identifiers over the tile domain of the tile 300.

For example, the distribution of the class identifiers id_z over the domain of the tile 300 may be fitted into the fitting function ID (y, x_ref) expressed as follows:

$$z = ID(y, x\_ref) \quad \text{[Equation 2]}$$

where z is a class identifier having an integer value between 1 to 1728, x_ref represents the second relative position in a row within the tile domain of the reference image 104, and y represents a position in the reference image 104.

Equation 2 may be reformulated to calculate the second relative position x_ref as follows:

$$x\_ref = F_x(y, z)$$

$$F_x(y, z) = a*(z - \text{mod}(z-1, 4*s) - 1) + b*y \quad \text{[Equation 3]}$$

where,
y is a y coordinate in the reference image 104 that may be referred as a row number, which corresponds to a y coordinate of the captured image 106,
s is a horizontal dot sampling rate which corresponds to a number of pixels arranged horizontally in a dot,
a=1/(4s·sin θ),
b=1/tan θ, θ is a rotation angle which will defined with reference to FIG. 6, and
z is a pixel class identifier that is extracted in step S240.

In Equation 3, the "mod" function returns the remainder after division of (z−1) by (4*s), where (z−1) is the dividend and (4*s) is the divisor. For y, z, s and θ, the reformulated function (y, z) of Equation 3 returns the second relative position x_ref within the tile domain of the reference image 104.

Alternatively, Equation 2 may be reformulated to calculate the second relative position x_ref as follows:

$$x\_ref = F_x(y, z) \quad \text{[Equation 4]}$$

$$F_x(y, z) = a*\left(z - \cos\frac{\pi}{2s}z + \sin\frac{\pi}{2s}z - \frac{1}{2s}\cos(s\pi z) - 1\right) + b*y$$

where,
y is a y coordinate in the reference image 104
s is a horizontal dot sampling rate,
z is a pixel class identifier that is extracted in step S240,
a=1/(4s·sin θ), and
b=1/tan θ.

For y, z, s and θ, the reformulated function $F_x$ (y, z) of Equation 4 returns the second relative position x_ref the tile domain of the reference image 104.

In step S220, the projector 101 generates a projected image 400 from the reference image 104 and illuminates the projected image 400 onto the object 105. The plurality of dots of the reference image 104 are transferred to the projected image 400. In an exemplary embodiment, the projected image 400 may be rotated at a predetermined rotation angle θ as shown in FIG. 6. In an exemplary embodiment, the predetermined rotation angle θ may be 12 degree, for example. The present inventive concept is not limited thereto. For example, the predetermined rotation angle θ may be an angle below 90 degree. [Please elaborate on what effects are obtained by the rotation.]

In step S230, the camera 102 captures the projected image 400 onto the object 105 and generates the captured image 106. In FIG. 7, an exemplary captured image is shown. The object 105 that is three-dimensional may deform the projected image 400 along a three-dimensional surface profile of the object 105.

The resolutions of the projector 101 and the camera 102 may be different. For example, the projector 101 may project the reference image 104 in a video graphics array (VGA) resolution (e.g., 640×480 pixels), and the camera 102 may have a resolution that is higher (e.g., 1280×720 pixels). The captured image 106 may be down-sampled and/or only the area illuminated by the projector 101 may be analyzed to generate the depth map 107.

In FIG. 7, the observed pixel $p_c$ (x, y) may need translation into the tile domain of the captured image 106, thereby generating the first relative position x' within the tile domain. Since the second relative position x_ref is a relative position within the tile domain of the reference image 104, rather than the absolute position in an entire row in the reference image 104, the observed position x of the observed pixel $p_c$ (x, y) need to be translated to the tile domain of the captured image 106. The "tile domain" of the captured image 106 represents relative coordinates on which the plurality of projected dots of each projected tile onto the object 105 are distributed with a unique relative location within each projected tile of the captured image 106. The translation will be described in detail with reference to step S250.

In step S240, the processor 103 analyzes the captured image 106 to extract a class identifier id_z of the observed pixel $p_c$ (x, y), for example, from the captured image 106. The processor 103 may scan the captured image 106 as shown in FIG. 7 line by line. The processor 103 moves a window 500 along a scan line 600, thereby extracting a class identifier within a pixel of the window 500 using various algorithms. Examples of those various algorithms to extract a class identifier are provided in U.S. patent application Ser. No. 15/907,242 to Shi et al., of which specification is entirely incorporated herein by reference.

In step S250, the processor 103 translates the observed pixel $p_c$ (x, y) into the tile domain of the captured image 106, thereby generating the first relative position x' for the observed pixel $p_c$ (x, y). In an exemplary embodiment, the following equation may be used to calculate the first relative position x' of the observed pixel $p_c$ (x, y):

$$x \leftarrow F((x+x\_offset) \% (48*s))*\cos \theta - ((y+y\_offset) \% (48*s*b))*\sin \theta, \quad \text{[Equation 5]}$$

wherein:
x is a x coordinate in the captured image 106,
y is a y coordinate in the captured image 106
% is a remainder operator,
s is a horizontal dot sampling rate,
z is a class identifier for the observed pixel $p_c$ (x, y),
b=1/tan θ, and
x_offset and y_offset that are system parameter set by a calibration of the structured light pattern system 100.

In step S260, the processor 103 calculates the second reference position x_ref using the Equation 3 or Equation 4. With a row number (or y coordinate) of the observed pixel $p_c$ (x, y) in the captured image 106 and the class identifier id_z obtained in step S240, the Equation 3 returns the second relative position x_ref of a dot on the reference image 104 corresponding to the observed pixel $p_c$ (x, y) on the captured image 106.

In step S270, the processor 103 calculates a depth map using a disparity to reconstruct the three-dimensional surface profile of the object 105. With the first relative position x' on the captured image 106 and the second relative position x_ref calculated from Equation 3 or 4, the processor 103 may calculate a disparity d according to the Equation 1, and reconstruct a three-dimensional surface profile of the object 105 using the disparity (d).

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of reconstructing a three dimensional image using a structured light pattern system, the method comprising:
    extracting a class identifier of an observed pixel on a captured image by a camera, wherein the observed pixel has a coordinate (x, y) on the captured image;
    calculating a first relative position of the x coordinate of the observed pixel in a tile domain of the captured image;
    calculating a second relative position of one of a plurality of dots in a tile domain of a reference image using the extracted class identifier; and
    calculating a disparity of the observed pixel using the first relative position and the second relative position.

2. The method of claim 1,
wherein the calculating of the first relative position includes:
translating the x coordinate of the observed pixel into the tile domain of the captured image to generate the first relative position in the tile domain of the captured image.

3. The method of claim 1, further comprising:
generating a projected image to be projected onto an object from the reference image, wherein the reference image includes a plurality of tiles,
wherein each of the tiles includes the plurality of dots each of which is assigned to one of a plurality of class identifiers and wherein the extracted class identifier is one of the plurality of class identifiers; and
generating the captured image from the projected image onto the object.

4. The method of claim 3,
wherein the projected image is projected as infrared light.

5. The method of claim 3,
wherein the plurality of class identifiers each is assigned to one of the plurality of dots left to right and row-by-row within the tile domain of the reference image,
wherein the plurality of class identifiers have continuously-increasing values from a first corner of the tile domain of the reference image to a second corner of the tile domain of the reference image facing diagonally the first corner.

6. The method of claim 3,
wherein the calculating of the second relative position is performed by using a function of which an input includes the extracted class identifier and an output is the second relative position, and wherein the function represents a distribution of the plurality of class identifiers on the tile domain of the reference image.

7. The method of claim 6,
wherein the input of the function further includes the y coordinate of the observed pixel.

8. The method of claim 7,
wherein the plurality of dots of the reference image is rotated at a predefined rotation angle in the projected image, and
wherein the input of the function further includes the predefined rotation angle.

9. The method of claim 8,
wherein the input of the function further includes a dot sampling rate, and
wherein the dot sampling rate corresponds to a number of pixels horizontally arranged in each of the plurality of dots.

10. The method of claim 3,
wherein each of the plurality of dots is divided into a plurality of sub-dots and Wherein the plurality of class identifiers are assigned to the plurality of sub-dots.

11. A method of reconstructing a three dimensional image using a structured light pattern system, the method comprising:
    generating a projected image to be projected onto an object from a reference image, wherein the reference image includes a plurality of tiles, wherein each of the tiles includes a plurality of dots each of which is assigned to one of a plurality of class identifiers;
    generating a captured image from the projected image onto the object;

extracting a class identifier of an observed pixel on the captured image; and calculating a first relative position of the observed pixel in a tile domain of the captured image;

calculating a second relative position of one of the plurality of dots in a tile domain of the reference image using the extracted class identifier and a y coordinate of the observed pixel; and calculating a disparity of the observed pixel using the first relative position and the second relative position.

12. The method of claim 11, wherein the plurality of class identifiers each is assigned to one of the plurality of dots loft to right and row-by-row within the tile domain of the reference image, wherein the plurality of class identifiers have continuously-increasing values from a first corner of the tile domain of the reference image to a second corner of the tile domain of the reference image facing diagonally the first corner.

13. The method of claim 11, wherein the calculating of the first relative position includes:

translating the observed pixel into the tile domain of the captured image to generate the first relative position in the tile domain of the captured image.

14. The method of claim 11, wherein the calculating of the second relative position is performed by using a function of which an input includes the extracted class identifier and the y-coordinate of the observed pixel and an output is the second relative position, and wherein the function represents a distribution of the plurality of class identifiers on the tile domain of the reference image.

15. The method of claim 14, wherein the plurality of dots of the reference image is rotated at a predefined rotation angle in the projected image, and wherein the input of the function further includes the predefined rotation angle.

16. A method of reconstructing a three dimensional image using a structured light pattern system, the method comprising:

generating a reference image including a plurality of tiles, wherein each of the tiles includes a plurality of dots each of which is assigned to one of a plurality of class identifiers;

projecting a projected image generated from the reference image onto an object having a three-dimensional surface;

capturing the projected image onto the object to generate a captured image;

extracting a class identifier from an observed pixel on the captured image; and translating the observed pixel into a tile domain of the captured image to generate a first relative position in the tile domain of the captured image;

calculating a second relative position of one of the plurality of dots in a tile domain of the reference image using the extracted class identifier;

calculating a disparity of the observed pixel using the first relative position and the second relative position; and generating a three-dimensional profile of the object using the disparity.

17. The method of claim 16, wherein the calculating of the second relative position of the reference image is performed using a function representing a distribution of the plurality of class identifiers on the tile domain of the reference image, wherein the extracted class identifier is a first input of the function, and wherein a row number of the observed pixel in the captured image is a second input of the function.

18. The method of claim 17, wherein the plurality of dots of the reference image is rotated at a predefined rotation angle in the projected image, and wherein the predefined rotation angle is a third input of the function.

19. The method of claim 17, wherein a dot sampling rate is a fourth input of the function, and wherein the dot sampling rate corresponds to a number of pixels horizontally arranged in each of the plurality of dots.

20. The method of claim 16, wherein the generating of the reference image includes:

assigning each of the plurality of class identifiers to one of the plurality of dots, wherein integer values of the plurality of class identifiers increase successively.

* * * * *